UNITED STATES PATENT OFFICE.

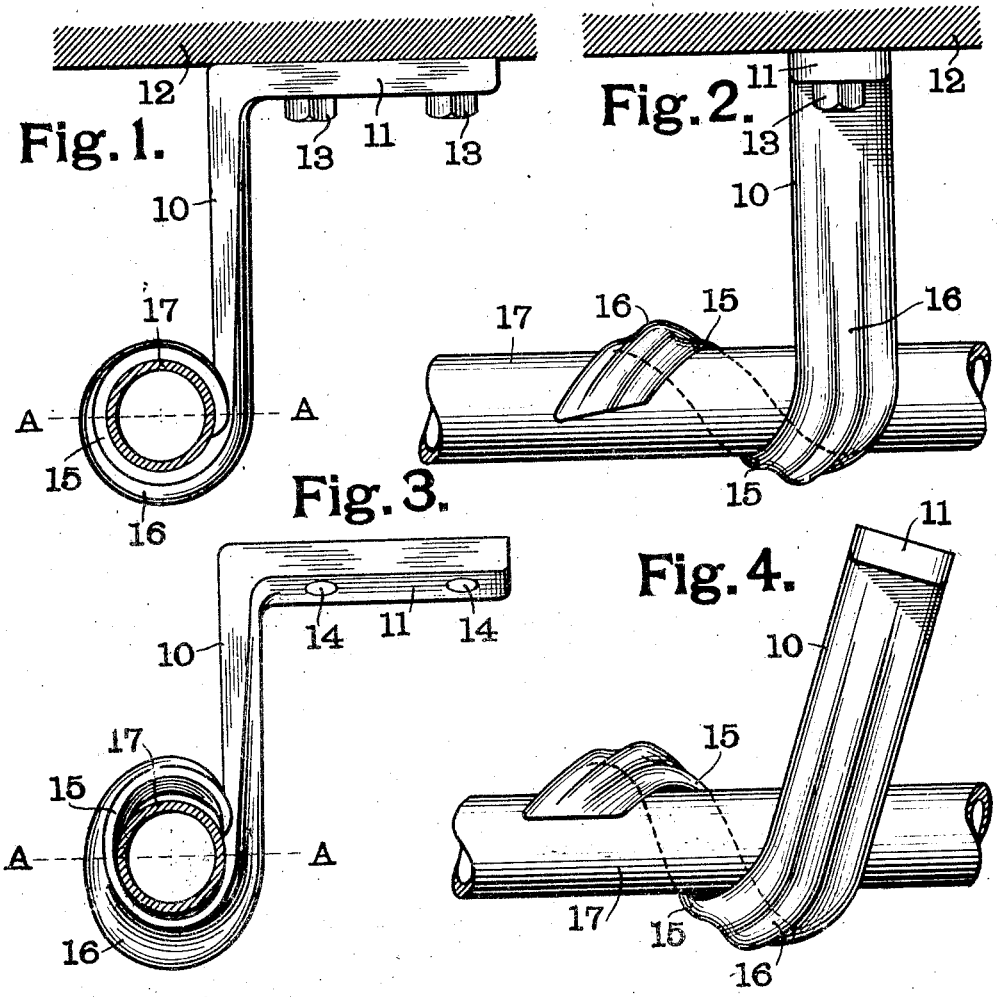

LOUIS A. HOERR, OF ST. LOUIS, MISSOURI.

PIPE-HANGER.

1,057,057.  Specification of Letters Patent.  Patented Mar. 25, 1913.

Application filed August 6, 1910. Serial No. 575,882.

*To all whom it may concern:*

Be it known that I, LOUIS A. HOERR, a citizen of the United States, residing at the city of St. Louis, Missouri, have invented a certain new and useful Pipe-Hanger, of which the following is such a full, clear, and exact description as will enable any one skilled in the art to which it appertains to make and use the same, reference being had to the accompanying drawings, forming part of this specification.

The object of the present invention is to provide a pipe hanger in which the pipe is secured without the use of screws or nuts and to this end I provide the hanger with an integral gripping member which is preferably sprung into engagement with the pipe.

In the accompanying drawings which illustrate one form of pipe hanger made in accordance with my invention, Figure 1 is an end view; Fig. 2 is a side view; Figs. 3 and 4 are views similar to Figs. 1 and 2 but showing the hanger in position to be sprung into engagement with the pipe.

Like marks of reference refer to similar parts in the several views in the drawings.

10 is the body of the hanger. A step portion 11 of the hanger 10 is formed at right angles to the body 10 and is adapted to be secured to any suitable support, as for instance, the ceiling 12 by means of screws 13 passing through openings 14 in the said part 11. Formed integral with the body 10 of the hanger is a gripping or clamping member 15 which is spiral in form, as best shown in Figs. 2 and 4. This spiral gripping member 15 is made to slightly more than completely surround the circumference of the pipe, as is indicated by the end of the said member extending past the horizontal line A—A through the center of the pipe at right angles to the body 10, as illustrated in Fig. 1. The body 10 and gripping member 15 may be provided with a strengthening rib 16, as illustrated in the drawings. 17 represents the pipe which is engaged by the gripping member 15. Inasmuch as the gripping member 15 more than completely surrounds the pipe it will be necessary to spring the said gripping member into engagement with the pipe. This is done by bringing the parts into the position shown in Figs. 3 and 4 and thus forcing the body 10 of the hanger into a vertical position. By making the hanger fit the pipe snugly it will grip the pipe firmly so as to hold it not only against pivotal movement in any direction but also against longitudinal movement. The pipe, however, is not held sufficiently tight to prevent longitudinal movement due to expansion and contraction of the pipe. Furthermore, such movement does not tend in any way to lessen the hold on the hanger of the pipe. To remove the hanger from the pipe the above mentioned process is simply reversed.

The convolution of the helical extension is of such a pitch that the distance between the extremity of the gripping member and the shank of the hanger is such that the pipe may be positioned therein, after which the shank, which is substantially rigid, is moved in a direction parallel to the pipe to spring the yielding end of the helical extension thereover and properly position the end of the shank for attachment to its support.

What I claim as my invention is:

As an article of manufacture, a pipe hanger formed of a strip having a shank portion and a pipe engaging portion, the pipe engaging portion extending helically to one side of the shank portion and adapted to embrace a pipe, said pipe engaging portion being provided with a clamping end which is adapted to be sprung onto the pipe to hold it against movement.

In testimony whereof, I have hereunto set my hand and affixed my seal in the presence of the two subscribing witnesses.

LOUIS A. HOERR. [L. S.]

Witnesses:
 W. A. ALEXANDER,
 LAURENCE L. MEAD.